US012613795B2

(12) United States Patent
Hashimoto

(10) Patent No.: US 12,613,795 B2
(45) Date of Patent: Apr. 28, 2026

(54) AUTOMATED VEHICLE TESTING SYSTEM BASED ON REQUIREMENTS WRITTEN IN NATURAL LANGUAGE

(71) Applicant: WOVEN BY TOYOTA, INC., Tokyo (JP)

(72) Inventor: Daisuke Hashimoto, Chofu (JP)

(73) Assignee: WOVEN BY TOYOTA, INC., Tokyo (JP)

( * ) Notice: Subject to any disclaimer, the term of this patent is extended or adjusted under 35 U.S.C. 154(b) by 195 days.

(21) Appl. No.: 18/240,529

(22) Filed: Aug. 31, 2023

(65) Prior Publication Data

US 2025/0077401 A1      Mar. 6, 2025

(51) Int. Cl.
G06F 11/3668        (2025.01)
G06F 8/61        (2018.01)
G07C 5/00        (2006.01)
(52) U.S. Cl.
CPC ............ *G06F 11/3692* (2013.01); *G06F 8/61* (2013.01); *G07C 5/008* (2013.01)
(58) Field of Classification Search
CPC ............................... G06F 8/61; G06F 11/3692
See application file for complete search history.

(56) References Cited

U.S. PATENT DOCUMENTS 9,430,359 B1 *    8/2016  Troutman ........... G06F 11/0793
9,582,408 B1 *    2/2017  Jayaraman ......... G06F 11/3684
10,255,168 B2 *    4/2019  Stefan ................. G06F 11/3604
11,030,547 B2 *    6/2021  Jain ...................... G06Q 30/016
11,119,747 B2 *    9/2021  Orozco ............... G06F 11/3688
11,144,437 B2 *    10/2021  Allen .................... G06F 40/284
11,238,235 B2 *    2/2022  Rakshit ................. G06F 40/30
11,556,843 B2 *    1/2023  Backas .................. H04L 51/02
12,084,071 B1 *    9/2024  Gribble ................ B60W 50/06
2017/0330391 A1    11/2017  Uno
2018/0165895 A1 *    6/2018  Poeppel .............. G07C 5/0808
(Continued)

FOREIGN PATENT DOCUMENTS

WO      WO-2025042771 A2 *    2/2025

OTHER PUBLICATIONS

Erkan Tuncali, Cumhur, et al. "Requirements-driven Test Generation for Autonomous Vehicles with Machine Learning Components." arXiv e-prints (2019).*
(Continued)

*Primary Examiner* — Francisco J Aponte
(74) *Attorney, Agent, or Firm* — Sughrue Mion, PLLC

(57)        ABSTRACT

Provided are a method, system, and device for automated vehicle testing. The method may include, generating a ticket, wherein the ticket comprises at least one natural language testing requirement and at least one natural language incident scenario description; determining whether collected sensor data from a vehicle matches the at least one natural language incident scenario description in the ticket; based on determining that the collected sensor data from the vehicle matches the at least one natural language incident scenario description: generating a requirements as code (RaC) file based on the ticket and collected sensor data from a vehicle; and evaluating a ML model based on the RaC file to determine whether the ML model achieves the testing requirement, wherein the ML model is used to implement a vehicle application.

18 Claims, 4 Drawing Sheets

(56)  References Cited

U.S. PATENT DOCUMENTS

| | | | | |
|---|---|---|---|---|
| 2018/0225769 A1* | 8/2018 | Slusar | .................... | G06Q 50/40 |
| 2019/0227569 A1* | 7/2019 | Weslosky | ............. | G07C 5/0825 |
| 2019/0318277 A1* | 10/2019 | Goldman | ............. | G05D 1/0297 |
| 2019/0378363 A1 | 12/2019 | Becker | | |
| 2020/0073382 A1* | 3/2020 | Noda | .................... | G06V 20/58 |
| 2021/0001870 A1* | 1/2021 | Jang | .................... | G06F 11/3684 |
| 2021/0116938 A1* | 4/2021 | Sun | ........................ | G07C 5/085 |
| 2022/0204010 A1 | 6/2022 | Zhu et al. | | |
| 2022/0227231 A1* | 7/2022 | Husain | ................ | B60L 15/2045 |
| 2023/0205228 A1* | 6/2023 | Sun | ........................ | G06F 16/22 |
| | | | | 701/2 |

OTHER PUBLICATIONS

Tiedemann, Tim, et al. "An automotive distributed mobile sensor data collection with machine learning based data fusion and analysis on a central backend system." Procedia Technology 26 (2016).*

Saaristola, Tomas. "Data collection system for autonomous vehicles." (2022).*

* cited by examiner

400

Start

S410 — Generate a ticket

S420 — Determine whether collected sensor data matches incident scenario description or testing requirement description in ticket S430 — Generate a RaC file based on ticket and collected sensor data S440 — Evaluate ML model based on RaC file End

AUTOMATED VEHICLE TESTING SYSTEM BASED ON REQUIREMENTS WRITTEN IN NATURAL LANGUAGE

TECHNICAL FIELD

Systems and methods consistent with example embodiments of the present disclosure relate to an automated vehicle testing based on requirements which are written in natural language.

BACKGROUND

In the related art, the testing of automated vehicles systems may be implemented using machine learning (ML) models, which may be used to automate a variety of tasks related to operating the automated vehicle. To this end, it is necessary to collect testing data in order to test the vehicle applications.

Typically, such vehicles may be implemented with sensors (e.g., cameras, accelerometers, etc.) to collect data, and subsequently the operator/manufacturer may process the collected data for testing. To this end, the data which is collected by the sensors may be input into a vehicle application (which for instance, may be implemented using a ML model).

In the related art, data is collected from the vehicle and input into test vehicle applications based on rule-based trigger conditions. Particularly, such rule-based trigger conditions require explicit, deterministic, and clear definitions of the conditions for which sensor data is collected from the vehicle to a database/server. Such rule-based trigger conditions must be clearly specified, along with numerical criteria and strict conditions branches, and accordingly cannot contain any ambiguity. Because of such strict conditions for collecting the data, it may result in missing the collection of necessary data for the testing, and may lead to false positives/negatives during the collection.

Accordingly, there is a need for a system for collecting data which can allow for the testing requirements to be specified in a less strict manner.

SUMMARY

According to one or more example embodiments, apparatuses and methods are provided for automated vehicle testing based on natural languages. In particular, tickets of an issue tracking system may be generated based on testing requirements and incident scenario descriptions written in natural languages. Based on matching such tickets to collected sensor data from a vehicle, a coded file (e.g., a requirement as code (RaC) file) may be generated, and a machine learning (ML) model (which may implement a vehicle application) can be evaluated as to whether it matches the testing requirements or not based on the coded file. Accordingly, since the conversion of the human-readable testing requirements and human-readable incident scenario descriptions into a coded file is performed, an operator/developer can readily and broadly specify the conditions and requirements in which data may be collected since it is in a natural language prior to processing. Accordingly, the conditions for collecting data may be less strict and false positives/negatives may be avoided.

According to an embodiment, a method for testing vehicle applications, may be provided. The method may include: generating a ticket, wherein the ticket comprises at least one human-readable testing requirement and at least one natural language incident scenario description; determining whether collected sensor data from a vehicle matches the at least one human-readable incident scenario description in the ticket; based on determining that the collected sensor data from the vehicle matches the at least one human-readable incident scenario description: generating a requirements as code (RaC) file based on the ticket and collected sensor data from a vehicle; and evaluating a ML model based on the RaC file to determine whether the ML model achieves the testing requirement, wherein the ML model is used to implement a vehicle application. According to embodiments, the ticket may be generated based on an incident record (IR) ticket which is written in a natural language and a requirement description (RD) ticket which is written in a natural language. The ticket may be stored in a ticket database such as an issue tracking system (e.g., a system which can open and keep track of tickets when new issues need to be resolved), and the collected sensor data is obtained from a vehicle data database. Determining whether collected sensor data from a vehicle matches a description in the ticket may be performed using an image classifier and/or a neural network.

According to embodiments, the RaC file may include a ticket identifier, a file identifier, coded testing requirements, and a link to the collected sensor data. Generating the RaC file may include converting the at least one human-readable testing requirement into coded testing requirements.

According to embodiments, upon completion of evaluating the ML model based on the RaC file, the vehicle application is deployed into the vehicle. Upon completion of evaluating the ML model based on the RaC file, a status of the ticket may be updated based on a result of the evaluation.

According to embodiments, upon completion of generating the ticket, the ticket is received by a ticket receiver in the vehicle, and wherein the image classifier and/or the neural network is implemented in the vehicle. Based on determining that the collected sensor data from the vehicle matches the at least one human-readable incident scenario description, the collected sensor data may be transmitted by a data transmitter in the vehicle to a vehicle data database.

Additional aspects will be set forth in part in the description that follows and, in part, will be apparent from the description, or may be realized by practice of the presented embodiments of the disclosure.

BRIEF DESCRIPTION OF THE DRAWINGS

Features, aspects and advantages of certain exemplary embodiments of the disclosure will be described below with reference to the accompanying drawings, in which like reference numerals denote like elements, and wherein.

DETAILED DESCRIPTION

The following detailed description of example embodiments refers to the accompanying drawings. The disclosure provides illustration and description, but is not intended to be exhaustive or to limit one or more example embodiments to the precise form disclosed. Modifications and variations are possible in light of the disclosure or may be acquired from practice of one or more example embodiments. Further, one or more features or components of one example embodiment may be incorporated into or combined with another example embodiment (or one or more features of another example embodiment). Additionally, in the flowcharts and descriptions of operations provided herein, it is understood that one or more operations may be omitted, one or more operations may be added, one or more operations may be performed simultaneously (at least in part), and the order of one or more operations may be switched.

It will be apparent that example embodiments of systems and/or methods and/or non-transitory computer readable storage mediums described herein may be implemented in different forms of hardware, firmware, or a combination of hardware and software. The actual specialized control hardware or software code used to implement these systems and/or methods is not limiting of one or more example embodiments. Thus, the operation and behavior of the systems and/or methods and/or non-transitory computer readable storage mediums are described herein without reference to specific software code. It is understood that software and hardware may be designed to implement the systems and/or methods based on the descriptions herein.

Even though particular combinations of features are recited in the claims and/or disclosed in the specification, these combinations are not intended to limit the disclosure of possible example embodiments. In fact, many of these features may be combined in ways not specifically recited in the claims and/or disclosed in the specification. Although each dependent claim listed below may directly depend on only one claim, the disclosure of possible example embodiments includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Figure 1:
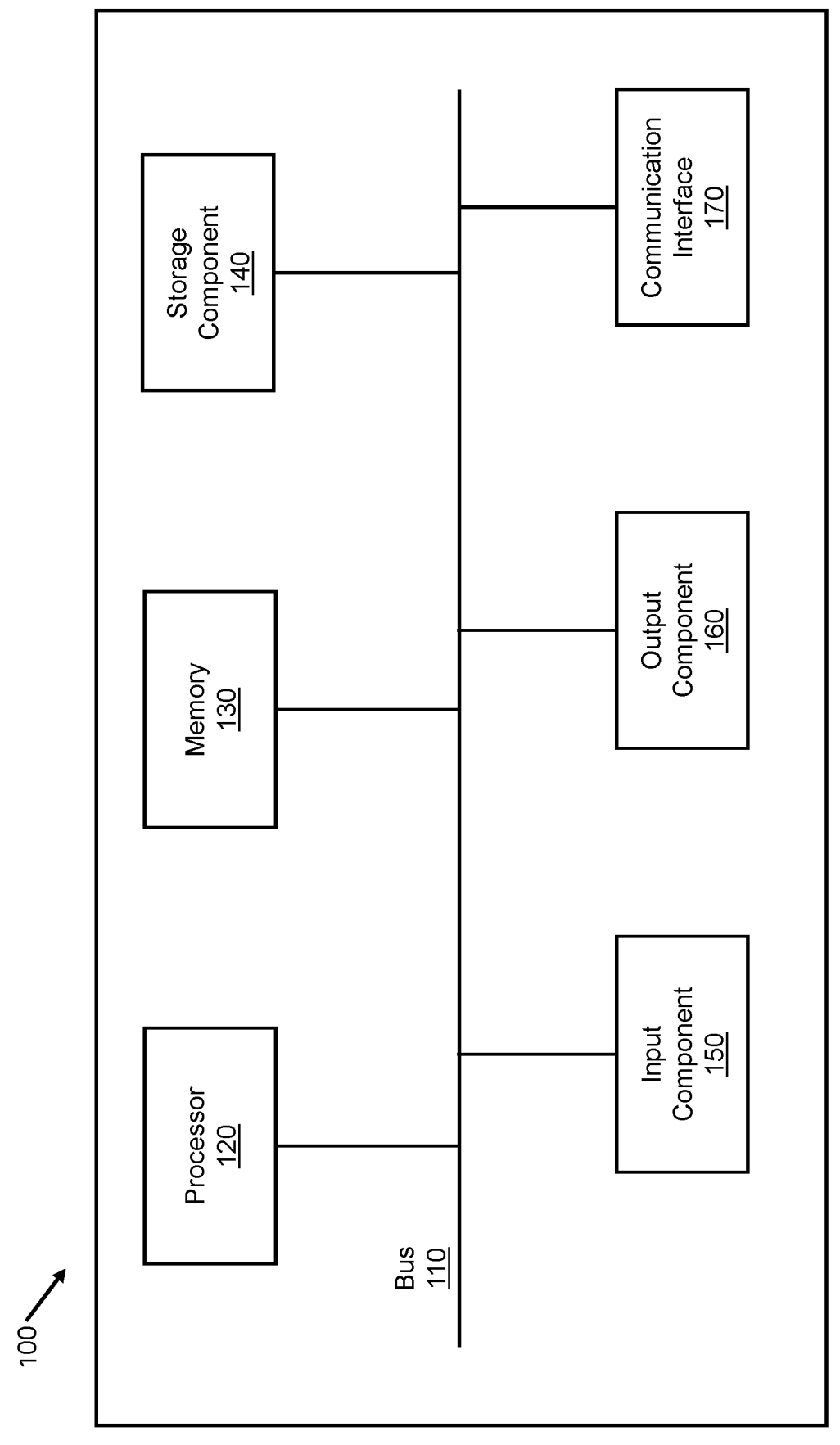
FIG. 1 is a diagram of example components of a device according to an example embodiment.

FIG. 1 is a diagram of example components of a vehicle testing device 100. As shown in FIG. 1, vehicle testing device 100 may include a bus 110, a processor 120, a memory 130, a storage component 140, an input component 150, an output component 160, and a communication interface 170.

Bus 110 includes a component that permits communication among the components of vehicle testing device 100. The processor 120 may be implemented in hardware, firmware, or a combination of hardware and software. Processor 120 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In one or more example embodiments, the processor 120 includes one or more processors capable of being programmed to perform a function. The memory 130 includes a random access memory (RAM), a read only memory (ROM), and/or another type of dynamic or static storage device (e.g., a flash memory, a magnetic memory, and/or an optical memory) that stores information and/or instructions for use by the processor 220.

Storage component 140 stores information and/or software related to the operation and use of vehicle testing device 100. For example, the storage component 140 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 150 includes a component that permits vehicle testing device 100 to receive information, such as via user input (e.g., a touch screen display, a keyboard, a keypad, a mouse, a button, a switch, and/or a microphone). Additionally, or alternatively, input component 150 may include a sensor for sensing information (e.g., a global positioning system (GPS) component, an accelerometer, a gyroscope, and/or an actuator). Output component 160 includes a component that provides output information from vehicle testing device 100 (e.g., a display, a speaker, and/or one or more light-emitting diodes (LEDs)).

The communication interface 170 includes a transceiver-like component (e.g., a transceiver and/or a separate receiver and transmitter) that enables vehicle testing device 100 to communicate with other devices, such as via a wired connection, a wireless connection, or a combination of wired and wireless connections. The communication interface 170 may permit the vehicle testing device 100 to receive information from another device and/or provide information to another device. For example, the communication interface 170 may include, but is not limited to, an Ethernet interface, an optical interface, a coaxial interface, an infrared interface, a radio frequency (RF) interface, a universal serial bus (USB) interface, a Wi-Fi interface, a cellular network interface, or the like.

The vehicle testing device 100 may perform one or more example processes described herein. According to one or more example embodiments, the vehicle testing device 100 may perform these processes in response to the processor 120 executing software instructions stored by a non-transitory computer-readable medium, such as the memory 130 and/or the storage component 140. A computer-readable medium is defined herein as a non-transitory memory device. A memory device includes memory space within a single physical storage device or memory space spread across multiple physical storage devices.

Software instructions may be read into the memory 130 and/or the storage component 140 from another computer-readable medium or from another device via the communication interface 170. When executed, software instructions stored in the memory 130 and/or the storage component 140 may cause the processor 120 to perform one or more processes described herein.

Additionally, or alternatively, hardwired circuitry may be used in place of, or in combination with, software instructions to perform one or more processes described herein. Thus, one or more example embodiments described herein are not limited to any specific combination of hardware circuitry and software.

The number and arrangement of components shown in FIG. 1 are provided as an example. In practice, the vehicle testing device 100 may include additional components, fewer components, different components, or differently arranged components than those shown in FIG. 1. Additionally, or alternatively, a set of components (e.g., one or more components) of the vehicle testing device 100 may perform one or more functions described as being performed by another set of components of the vehicle testing device 100.

Figure 2:
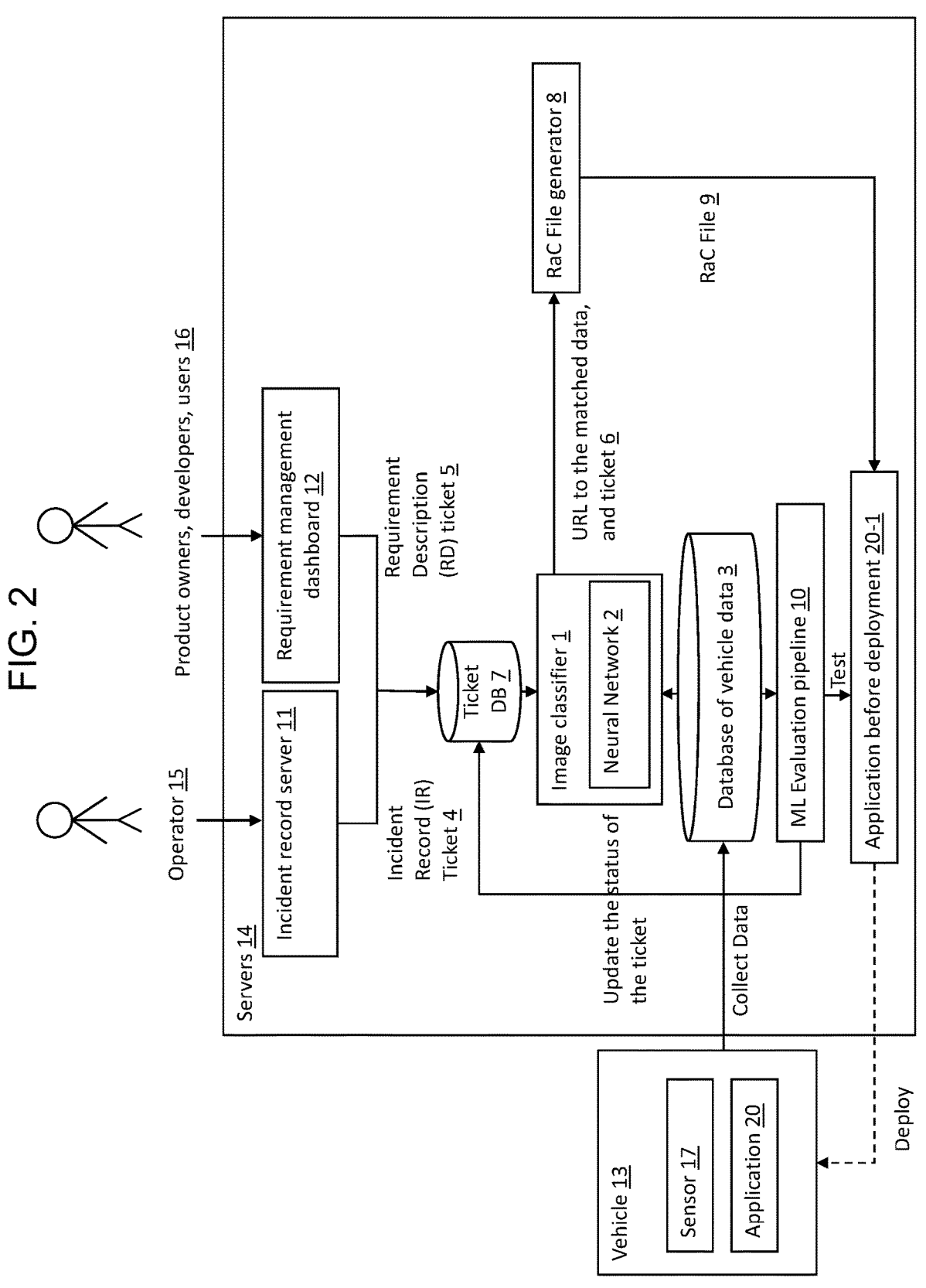
FIG. 2 is a system architecture diagram according to one or more example embodiments.

FIG. 2 is a system architecture diagram according to one or more example embodiments. In particular, FIG. 2 illustrates an embodiment in which a vehicle application implemented using a machine learning (ML) model is tested.

According to embodiments, a vehicle 13 may be provided, which is in communication with servers 14. It should be appreciated that servers 14 may be implemented in a single server, as multiple servers, or using cloud applications, depending on the specific implementation. An operator 15 and a product owner/developer/user 16 may be able to interact with the servers 14.

The vehicle 13 may include at least one sensor 17, and a vehicle application 20. In particular, the at least one sensor 17 may include, but is not limited to, a camera, an accelerometer, a gyroscope, an IR sensor, etc. The at least one sensor 17 may be responsible for collecting data related to testing the vehicle. The at least one sensor 17 may be able to transmit the collected data to a vehicle data database 3 located in servers 14. Vehicle application 20 may be any application which is related to the operation of vehicle 13 (e.g., related to steering or acceleration of the vehicle 13). Vehicle application 20 may be implemented using a machine learning (ML) model.

Servers 14 may include an incident record server 11, and a requirement management dashboard 12. Incident record server 11 may include a collection of incident scenarios which may be input by operator 15 in a natural language. In particular, the natural language may be in any known human language, and according to some embodiments, it may be written in a structure which can be readily be understood by a person who may not necessarily have knowledge of how to interpret code. In other words, a natural language may encompass human language which would be understood by an ordinary person when interpreted (e.g., in a conversation or reading). The incident scenarios may specify situations in which the vehicle application 20 has to make a decision as to how to operate vehicle 13, for example, it may specify that there is an oncoming vehicle from two lanes to the left and within an arbitrary horizontal and vertical distance. Based on the collection of human-readable incident scenarios, incident record server may be able to generate/store/output an incident record (IR) ticket 4, which is also in a natural language. It should be appreciated that the incident scenarios may include, but are not necessarily limited to real scenarios, or test scenarios.

Requirement management dashboard 12 (which may be implemented as its own server in some embodiments) may include a collection of testing requirements which may be input by product owner/developer/user 16 in a natural language. The testing requirements may specify a test target, test conditions, or test criteria related to the operation of vehicle 13. Based on the collection of testing requirements, requirement management dashboard may be able to generate/store/output a requirement description (RD) ticket 5, which is also in a natural language.

Based on IR ticket 4 and RD ticket 5, a ticket 6 may be generated (for instance, by combining IR ticket 4 and RD ticket 5), and may accordingly be stored in a ticket database 7 in servers 14. Each ticket 6 may have its own unique identifier (ID). It should be appreciated that although a database is specified, other means of storage (e.g., cloud storage, content distribution network) may also be implemented for storing tickets.

A sensor data classifier 1 may also be provided in servers 14. According to some embodiments wherein the collected sensor data is an image, sensor data classifier 1 may be an image classifier which is implemented utilizing a neural network 2. Sensor data classifier 1 may be used to compare a ticket 6 with collected sensor data obtained from vehicle data database 3, in order to determine whether or not a particular collected sensor data matches an incident scenario description and/or testing requirement description in ticket 6. Although an image classifier and/or neural network may be used to perform this operation, it should be appreciated that other means of comparison of the collected sensor data with the incident scenario description in ticket 6 may be used.

Upon determining a match between the description of the ticket 6 and collected sensor data from vehicle data database 3, a link (i.e. URL) to the matched data and the ticket 6 may be sent to an requirements as code (RaC) file generator 8 located in servers 14, which can generate an RaC file 9 based on the link to the collected sensor data and ticket 6.

RaC file 9 may contain the ticket ID (e.g., in relation to ticket 6), a unique file ID (which may be used to uniquely identify RaC file 9), test requirements (test target, test conditions, test criterias, etc.) which are converted from natural languages written in ticket 6 into code, and a link (URL) to the collected sensor data stored in vehicle data database 3.

RaC file 9 may be responsible for storing expected behaviors of an ML model. The expected behaviors may comprise the test requirements. In particular, test requirements may specify what the performance metrics of the ML model which need to be tested, for example, based on a specific metric number which needs to be achieved, a standard which needs to be achieved, a type of test, etc. The RaC file 9 may accordingly include, as test requirements, test parameters, test targets, URL or file paths of test data, requirements, pass criteria, test conditions, acceptance requirements, acceptance criteria, which are to be used during the ML evaluation process. Such requirements, test targets, file paths of test data, pass criteria, and test conditions may be readily interpreted (for example, by a ML evaluation pipeline 10) in order to determine how the ML testing and evaluation of ML model should be executed by the ML evaluation pipeline, and subsequently executed by ML evaluation pipeline 10. For example, the RaC file 9 may contain a criteria in the form of code, and ML evaluation pipeline may readily interpret the code into an instruction for how to execute the ML evaluation of a ML model. RaC file 9 may be in a format such as YAML format or a Domain Specific Language (DSL) format. RaC file 9 may also be in a format of programming languages such as Python. Since the RaC file 9 is separate from the code which is used to actually run the ML evaluation, it may obviate the need to "hard code" the requirements into the ML evaluation process.

ML evaluation pipeline 10 may be provided to test a ML model based on RaC file 9. The ML evaluation pipeline may include an interface to interpret the requirements which are specified in RaC file 9, and an interface to evaluate the ML model based on the interpreted requirements. The ML evaluation pipeline 10 may use the link (URL), file path or unique key to the collected sensor data in the RaC file 9 in order to obtain the collected sensor data from vehicle data database 3 during testing. Based on the result of the ML evaluation, the tested ML model may be used to generate an application prior to deployment 20-1, and then subsequently deployed into vehicle 13 as vehicle application 20. ML evaluation pipeline 10 may also update the status of the ticket 6 in ticket database 7 based on the result of the ML evaluation. It should be appreciated that although ML evaluation pipeline 10 is specified, any appropriate means for interpreting the requirements from the RaC file and evaluating ML model based on the interpreted requirements may be used, according to embodiments.

Figure 3:
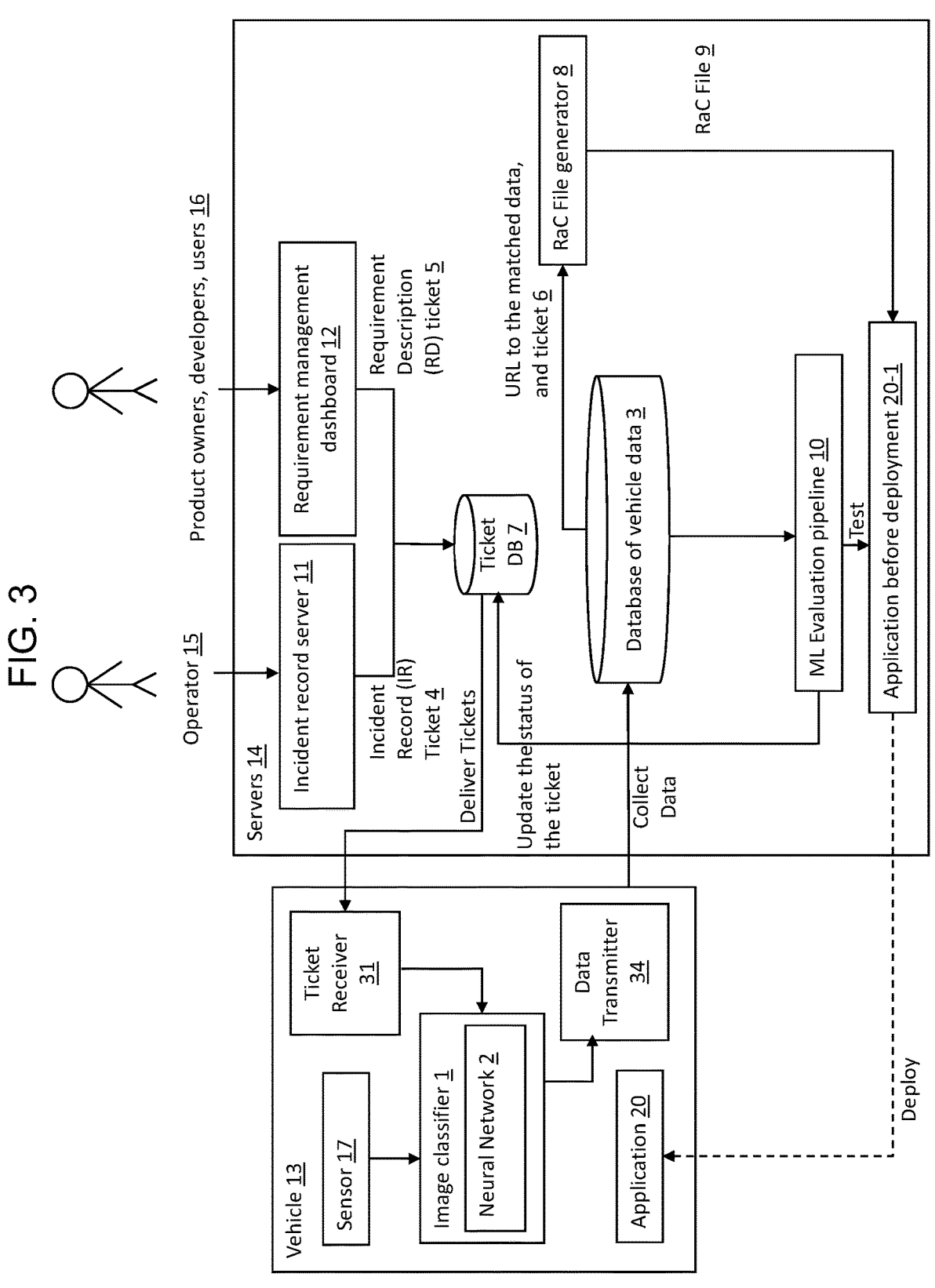
FIG. 3 is an alternative system architecture diagram according to one or more example embodiments.

FIG. 3 is an alternative system architecture diagram according to one or more example embodiments. In particular, FIG. 3 illustrates an example embodiment in which vehicle data is collected, and accordingly used to test vehicle applications. Similar components to FIG. 2 are included, and accordingly, redundant descriptions may be excluded for readability.

Notably, with respect to the embodiment illustrated in FIG. 2, the embodiment illustrated in FIG. 3 provides a vehicle 13 which additionally includes a ticket receiver 31, a data transmitter 34, and sensor data classifier 1 and/or neural network 2 and located in the vehicle 13 rather than servers 14. Ticket receiver 31 may be able to receive the ticket 6 from ticket database 7. It should be appreciated that ticket 6 may be received in a compressed, encrypted, or partially embedded to feature map format, according to some embodiments.

Sensor data classifier 1 and/or neural network 2 may similarly be configured to determine whether or not the collected sensor data obtained from the at least one sensors 17 matches the description of ticket 6. In the case that it matches, data transmitter 34 may be able to transmit the collected sensor data to vehicle data database 3. When servers 14 receives the collected sensor data from data transmitter 34, the URL of the received data may be sent to RaC file generator 8. Thus, in the embodiment illustrated in FIG. 3, as the number of test data to test the requirement or incident scenario written in ticket 6 are collected increases, the number of tests corresponding to ticket 6 will also increase.

Figure 4:
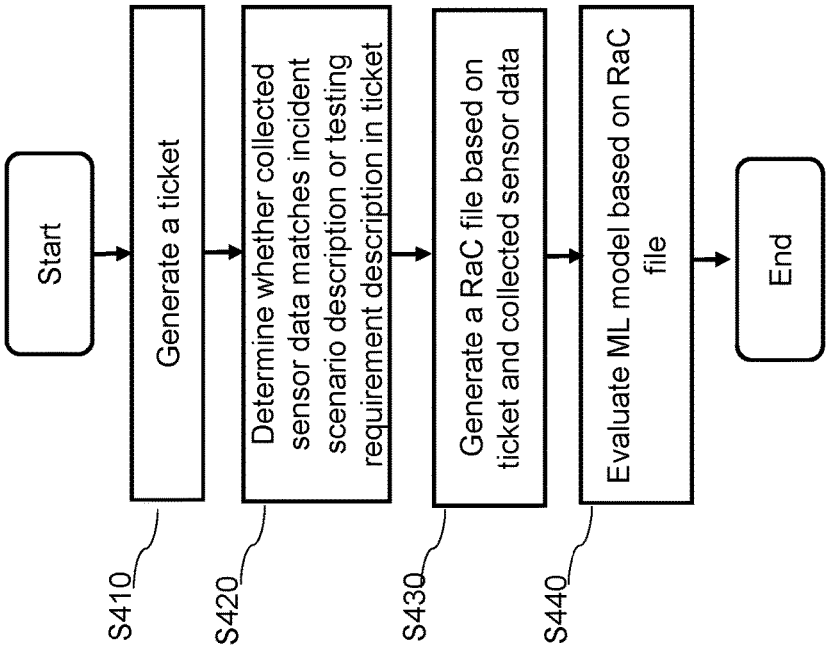
FIG. 4 is a flowchart diagram showing a method for testing a vehicle application based on a ticket according to one or more example embodiments.

FIG. 4 is a flowchart diagram showing a method 400 for testing a vehicle application based on a ticket according to one or more example embodiments. It should be appreciated that the system architectures illustrated in FIGS. 2 and 3 may be used to implement method 400, according to some embodiments.

Referring to FIG. 4, at operation S410, a ticket 6 may be generated, which includes at least one human-readable testing requirement and one human-readable incident scenario description. According to some embodiments, this may be performed by combining an incident record (IR) ticket 4 obtained from incident record server 11, and a requirement description (RD) ticket 5 obtained from requirement management dashboard 12, and written in a natural language. According to some embodiments, ticket 6 may be stored in a ticket database 7.

According to some embodiments, the ticket 6 may be received by a ticket receiver 31 in the vehicle 13.

At operation S420, it may be determined as to whether collected sensor data from a vehicle (i.e., vehicle 13) matches the at least one human-readable incident scenario description and/or testing requirement description in the ticket 6. According to some embodiments, this may be performed using a sensor data classifier 1 and/or a neural network 2. According to embodiments, the collected sensor data may be originally stored in a vehicle data database 3. According to some embodiments, sensor data classifier 1 and/or a neural network 2 may be implemented in the vehicle.

At operation S430, an RaC file 9 may be generated based on the ticket 6 and the collected sensor data. According to embodiments, operation S430 may only be performed if it was determined in operation S420 that there is a match between the collected sensor data and the incident description scenario from ticket 6. The RaC file 9 may include a ticket identifier (which may be the same one as in ticket 6), a file identifier, coded testing requirements, and a link to the collected sensor data. The coded testing requirements may be generated based on converting the human-readable testing requirements from ticket 6. Operation S430 may be performed by RaC file generator 8 according to embodiments.

According to some embodiments, based on determining that the collected sensor data from the vehicle 13 matches the at least one natural language incident scenario description and/or testing requirement description, the collected sensor data may be transmitted by a data transmitter 34 in the vehicle 13 to a vehicle data database 3.

At operation S440, the ML model (which may be used to implement vehicle application 20) may be evaluated based on RaC file 9 as generated in operation S430. Particularly, this may evaluate as to whether or not the ML model achieves the testing requirement that was originally specified in ticket 6 (and as interpreted from RaC file 9). Operation S440 may be implemented using an ML evaluation pipeline 10 which can interpret the requirements from RaC file 9 and execute the evaluation based on the interpreted requirements. According to some embodiments, upon completion of operation S440, the vehicle application may be implemented and deployed into the vehicle 13. Upon completion of operation S440 in some embodiments, the status of the ticket 6 may be updated as a result of the evaluation.

Based on the above embodiments, since the conversion of the human-readable testing requirements and human-readable incident scenario descriptions into a coded file is performed, an operator/developer can readily and broadly specify the conditions and requirements in which data may be collected since it is in a natural language prior to processing. Accordingly, the conditions for collecting data may be less strict and false positives/negatives may be avoided.

The foregoing disclosure provides illustration and description, but is not intended to be exhaustive or to limit one or more example embodiments to the precise form disclosed. Modifications and variations are possible in light of the disclosure or may be acquired from practice of one or more example embodiments.

One or more example embodiments may relate to a system, a method, and/or a computer readable medium at any possible technical detail level of integration. Further, one or more of the components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In one or more example embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible example embodiments of systems, methods, and computer readable media according to one or more example embodiments. In this regard, each block in the flowchart or block diagrams may represent a microservice(s), module, segment, or portion of instructions, which comprises one or more executable instructions for implementing the specified logical function(s). The method, computer system, and computer readable medium may include additional blocks, fewer blocks, different blocks, or differently arranged blocks than those depicted in the drawings. In one or more alternative example embodiments, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of one or more example embodiments. Thus, the operation and behavior of the systems and/or methods were described herein without reference to specific software code—it being understood that software and hardware may be designed to implement the systems and/or methods based on the description herein.

What is claimed is:

1. A method for testing vehicle applications, the method comprising:

generating a ticket, wherein the ticket comprises at least one natural language incident scenario description;

determining whether collected sensor data from a vehicle matches the at least one natural language incident scenario description in the ticket; and based on determining that the collected sensor data from the vehicle matches the at least one natural language incident scenario description:

generating a requirements as code (RaC) file based on the ticket and the collected sensor data from a vehicle; and evaluating a ML model based on the RaC file to determine whether the ML model achieves a testing requirement, wherein the ML model is used to implement a vehicle application.

2. The method as claimed in claim 1, wherein the ticket is generated based on an incident record (IR) ticket which is written in a natural language.

3. The method as claimed in claim 1, wherein the ticket is stored in a ticket database, and the collected sensor data is obtained from a vehicle data database.

4. The method as claimed in claim 1, wherein determining whether the collected sensor data from the vehicle matches the at least one natural language incident scenario description in the ticket is performed using a sensor data classifier and/or a neural network.

5. The method as claimed in claim 1, wherein the RaC file comprises a ticket identifier, a file identifier, coded testing requirements, and a link to the collected sensor data.

6. The method as claimed in claim 1, wherein upon completion of evaluating the ML model based on the RaC file, the vehicle application is deployed into the vehicle.

7. The method as claimed in claim 1, wherein upon completion of evaluating the ML model based on the RaC file, a status of the ticket is updated based on a result of the evaluation.

8. The method as claimed in claim 4, wherein upon completion of generating the ticket, the ticket is received by a ticket receiver in the vehicle, and wherein the sensor data classifier and/or the neural network is implemented in the vehicle.

9. The method as claimed in claim 8, wherein based on determining that the collected sensor data from the vehicle matches the at least one natural language incident scenario description, the collected sensor data is transmitted by a data transmitter in the vehicle to a vehicle data database.

10. An apparatus for testing vehicle applications, the apparatus comprising:

at least one memory storing computer-executable instructions; and at least one processor configured to execute the computer-executable instructions to:

generate a ticket, wherein the ticket comprises at least one natural language incident scenario description;

determine whether collected sensor data from a vehicle matches the at least one natural language incident scenario description in the ticket; and based on determining that the collected sensor data from the vehicle matches the at least one natural language incident scenario description:

generate a requirements as code (RaC) file based on the ticket and the collected sensor data from a vehicle; and evaluate a ML model based on the RaC file to determine whether the ML model achieves a testing requirement, wherein the ML model is used to implement a vehicle application.

11. The apparatus as claimed in claim 10, wherein the ticket is generated based on an incident record (IR) ticket which is written in a natural language.

12. The apparatus as claimed in claim 10, wherein the ticket is stored in a ticket database, and the collected sensor data is obtained from a vehicle data database.

13. The apparatus as claimed in claim 10, wherein determining whether the collected sensor data from the vehicle matches the at least one natural language incident scenario description in the ticket is performed using a sensor data classifier and/or a neural network.

14. The apparatus as claimed in claim 10, wherein the RaC file comprises a ticket identifier, a file identifier, coded testing requirements, and a link to the collected sensor data.

15. The apparatus as claimed in claim 10, wherein upon completion of evaluating the ML model based on the RaC file, the vehicle application is deployed into the vehicle.

16. The apparatus as claimed in claim 10, wherein upon completion of evaluating the ML model based on the RaC file, a status of the ticket is updated based on a result of the evaluation.

17. The apparatus as claimed in claim 13, wherein upon completion of generating the ticket, the ticket is received by a ticket receiver in the vehicle, and wherein the sensor data classifier and/or the neural network is implemented in the vehicle.

18. The apparatus as claimed in claim 17, wherein based on determining that the collected sensor data from the vehicle matches the at least one natural language incident scenario description, the collected sensor data is transmitted by a data transmitter in the vehicle to a vehicle data database.

* * * * *